US008685282B2

(12) United States Patent
Iaquaniello

(10) Patent No.: US 8,685,282 B2
(45) Date of Patent: Apr. 1, 2014

(54) PROCESS FOR THE PRODUCTION OF SYNGAS AND HYDROGEN STARTING FROM REAGENTS COMPRISING LIQUID HYDROCARBONS, GASEOUS HYDROCARBONS, AND/OR OXYGENATED COMPOUNDS, ALSO DERIVING FROM BIOMASSES, BY MEANS OF A NON-INTEGRATED MEMBRANE REACTOR

(75) Inventor: Gaetano Iaquaniello, Rome (IT)

(73) Assignee: KT—Kinetics Technology S.p.A., Rome (IT)

(*) Notice: Subject to any disclaimer, the term of this patent is extended or adjusted under 35 U.S.C. 154(b) by 0 days.

(21) Appl. No.: 13/582,753

(22) PCT Filed: Nov. 4, 2010

(86) PCT No.: PCT/IT2010/000443
§ 371 (c)(1),
(2), (4) Date: Sep. 5, 2012

(87) PCT Pub. No.: WO2011/138809
PCT Pub. Date: Nov. 10, 2011

(65) Prior Publication Data
US 2012/0326091 A1   Dec. 27, 2012

(30) Foreign Application Priority Data
May 4, 2010   (IT) .............................. RM2010A0216

(51) Int. Cl.
C01B 3/38   (2006.01)
B01J 7/00   (2006.01)
(52) U.S. Cl.
USPC ......................................... 252/373; 422/187
(58) Field of Classification Search
None
See application file for complete search history.

(56) References Cited

U.S. PATENT DOCUMENTS

2005/0036940 A1* 2/2005 Grace et al. .................. 423/652
2005/0172811 A1* 8/2005 Oyama et al. ...................... 96/4
(Continued)

FOREIGN PATENT DOCUMENTS

| EP | 0 842 894 | 5/1998 |
| EP | 1 626 033 | 2/2006 |
| FR | 2 823 192 | 10/2002 |
| GB | 2 274 284 | 7/1994 |
| WO | 01/51412 | 7/2001 |

OTHER PUBLICATIONS

International Search Report Feb. 4, 2011, corresponding to PCT/IT2010/000443.

(Continued)

Primary Examiner — Melvin C Mayes
Assistant Examiner — Douglas Call
(74) Attorney, Agent, or Firm — Young & Thompson

(57) ABSTRACT

A process for the production of syngas and hydrogen starting from liquid hydrocarbons, gaseous hydrocarbons and/or oxygenated compounds, also deriving from biomasses, and mixtures thereof, envisages recourse to a membrane reactor in an architecture that uses a succession of reaction and separation stages. The process includes a section for pre-heating the reagents, a number of sections for short-contact-time catalytic partial oxidation for producing syngas and hydrogen in a number of stages followed by separation of hydrogen produced via membranes, a thermal-recovery section, a section for removing produced carbon dioxide, and a section for cooling and removing condensate. Optionally, the process includes a section for purifying obtained hydrogen via pressure-swing adsorption (PSA) and generating purge gas with medium calorific value. Furthermore, the process includes a section for hydrodesulphuration of the reagents and could include a section for conversion of the $CO_2$ and $H_2$ produced by a reverse-water-gas-shift (RWGS) reaction.

15 Claims, 2 Drawing Sheets

(56) References Cited

U.S. PATENT DOCUMENTS

Figure 1:
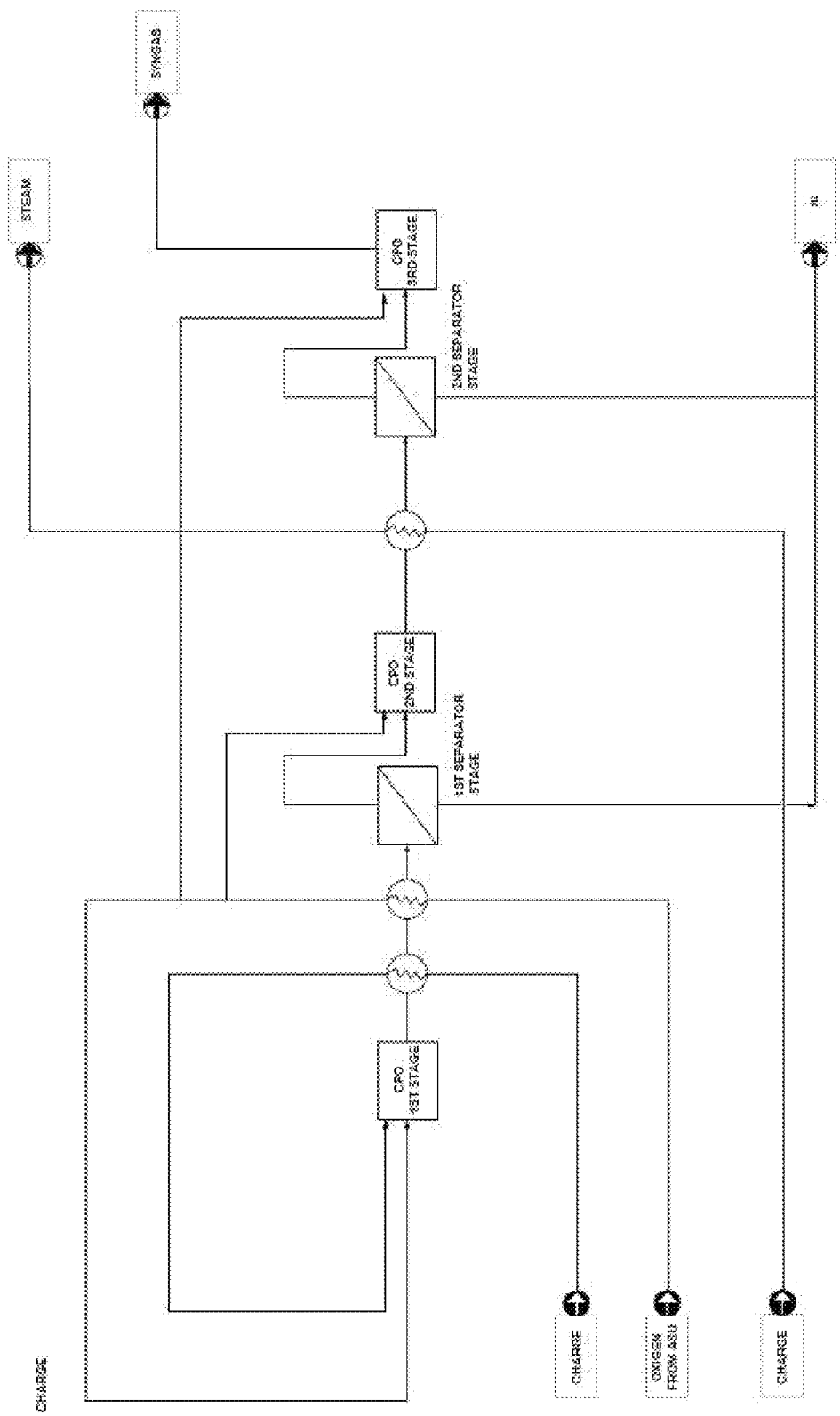

2006/0029539 A1* 2/2006 Dutta et al. .................. 423/651
2006/0029540 A1* 2/2006 Perna et al. .................. 423/651
2007/0130831 A1* 6/2007 Vipperla et al. ............ 48/197 R
2008/0272340 A1* 11/2008 Koh .............................. 252/373
2009/0232729 A1* 9/2009 Genkin et al. ................ 423/651

OTHER PUBLICATIONS

W. Zhu, et al.; "Catalytic Partial Oxidation of Gasoline to Syngas in a Dense Membrane Reactor"; Sep. 1, 2004; vol. 93-95, pp. 257-261.

* cited by examiner

PROCESS FOR THE PRODUCTION OF SYNGAS AND HYDROGEN STARTING FROM REAGENTS COMPRISING LIQUID HYDROCARBONS, GASEOUS HYDROCARBONS, AND/OR OXYGENATED COMPOUNDS, ALSO DERIVING FROM BIOMASSES, BY MEANS OF A NON-INTEGRATED MEMBRANE REACTOR

The present invention concerns a process for the production of syngas and hydrogen starting from liquid hydrocarbons, gaseous hydrocarbons, and/or oxygenated compounds, also deriving from biomasses, and mixtures thereof. Said process comprises the following steps:

pre-heating of the reagents and hydrodesulphuration of the charge;

two or more sections for short-contact-time catalytic partial oxidation (SCT-CPO) followed by one or more sections for separation of hydrogen with semi-permeable membranes operating at high temperature;

thermal recovery;

separation and recovery of $CO_2$ and its partial conversion to syngas on the last CPO stage and through the reverse-water-gas-shift (RWGS) reaction; and cooling and purification with pressure-swing adsorption (PSA) of the hydrogen produced.

PRIOR ART

So far the technology most widely used for the production of syngas is that of autothermal reforming (ATR), whereas the one used for the production of hydrogen is steam reforming (SR).

ATR technology converts the desulphurized light hydrocarbons, causing reaction thereof with oxygen and with a modest amount of steam, in a catalytic reactor according to the reactions (1), (2) and (3):

$$CH_4 + \tfrac{1}{2}O_2 = CO + 2H_2 \quad \Delta H° = -520 \text{ kJ/mol} \quad (1)$$

$$CH_4 + H_2O = CO_2 + H_2 \quad \Delta H° = -41 \text{ kJ/mol} \quad (2)$$

$$CO + H_2O = CO_2 + H_2 \quad \Delta H° = 206 \text{ kJ/mol} \quad (3)$$

The presence of non-negligible amounts of steam (typically the steam/carbon mole ratio, is higher than 0.6 to prevent formation of soot) means that the ratio between $H_2$ and CO is higher than the theoretical value of 2:1. As a consequence of this other than optimal ratio, recycling by the Fisher-Trops synthesis reactor proves necessary, which results in an increase in the size of the ATR section per unit product.

The output temperature of an ATR reactor can even reach 1050° C. in order to limit the content of $CH_4$ and $CO_2$ in the syngas (which normally should be lower than 3 vol % on a dry base).

In SR technology, instead, the desulphurized light hydrocarbons react with steam in direct-fired catalytic multitubular reactors, inserted in an oven, according to the reaction (4):

$$CH_4 + H_2O = CO + 3H_2 \quad \Delta H° = 49.3 \text{ kcal/mol} \quad (4)$$

External combustion has the function of supplying heat to the reactions, which are markedly endothermic. The hydrocarbons enter the reforming tubes after being mixed with considerable amounts of steam (typically, the steam/carbon mole ratio is greater than 2.5) and are converted into a mixture prevalently containing $H_2$ and CO (syngas). The catalysers typically contain nickel deposited on an oxide substrate.

The temperatures of the gas at input to the tubes are typically higher than 600° C., whilst the temperatures of the gas at output from the tubes are lower than 900° C. The pressure at which the SR process takes place is typically between 5 bar relative and 30 bar relative.

To obtain output temperatures of the syngas in the 800-900° C. range, the wall temperature of said tubes is approximately 100-150° C. higher and that of the fumes generated by the burners is 1200-1300° C. The result is that these tubes, obtained by fusion with special alloys with a high content of Cr and Ni (25/35%), represent element of criticality and high cost of the technology.

From the operative standpoint, in an environment such as a refinery, the management of an SR oven moreover raises a series of critical aspects that are today solved through careful and continuous monitoring of said oven.

To overcome some of the critical aspects inherent in SR technology, there have been proposed different configurations and technologies. One of these is represented by the process of short-contact-time catalytic partial oxidation (SCT-CPO) described in the patents Nos. MI93A001857, MI96A000690, MI2002A001133, MI2007A002209, and MI2007A002228 filed in the name of L. Basini et al. In this technology the hydrocarbons mixed with air and/or oxygen, are passed over an appropriate catalyst and converted into syngas. The heat of reaction is generated within the reactor, from balancing of the reactions of total and partial oxidation of the charge. In the case where natural as is used, the main reaction of the SCT-CPO process is represented by equation. (5)

$$CH_4 + \tfrac{1}{2}O_2 = CO + 2H_2 \quad \Delta H° = -8.5 \text{ kcal/mol[2]} \quad (5)$$

In this technology, the reactor proves very simplified in its constructional and operating principles. The reactor is of an adiabatic type and of dimensions more than two orders of magnitude smaller than the SR reactor, whilst it is similar to the one used for ATR even though of smaller size.

A first purpose of the invention is to develop a new process architecture that will render CPO more competitive as compared to the use of ATR technology for the production of syngas and as compared to the SR technology for the production of hydrogen, through the reduction of the charge capacity and of the consumption of oxygen. This has been obtained according to the invention by resorting to the use of membranes semi-permeable to hydrogen, which work at high temperature and enable this target to be achieved through the combined production of syngas and hydrogen.

Another purpose of the present invention is to develop an open architecture of the membrane reactor where the separation of hydrogen does not occur within the catalytic bed but in a subsequent step downstream of the CPO reactor. This involves the following advantages:

it enables separation of hydrogen at temperatures, (450-500° C.), lower than the operating temperature in CPO, thus increasing the stability and the life of the semi-metal or non-metallic inorganic permeable membranes;

the operating temperature of CPO can be optimized irrespective of the limits imposed by the membranes, by means of installation of a heat exchanger inserted between the CPO reactor and the membrane separator;

it simplifies the mechanical design of the membranes as compared to the integrated architecture in so far as the separation module can assume a simple, geometry, such as the "shell & tube" geometry;

it minimizes the problems of maintenance of the membranes and of the modules and of replacement of the catalyst as compared to an integrated architecture.

Figure 2:
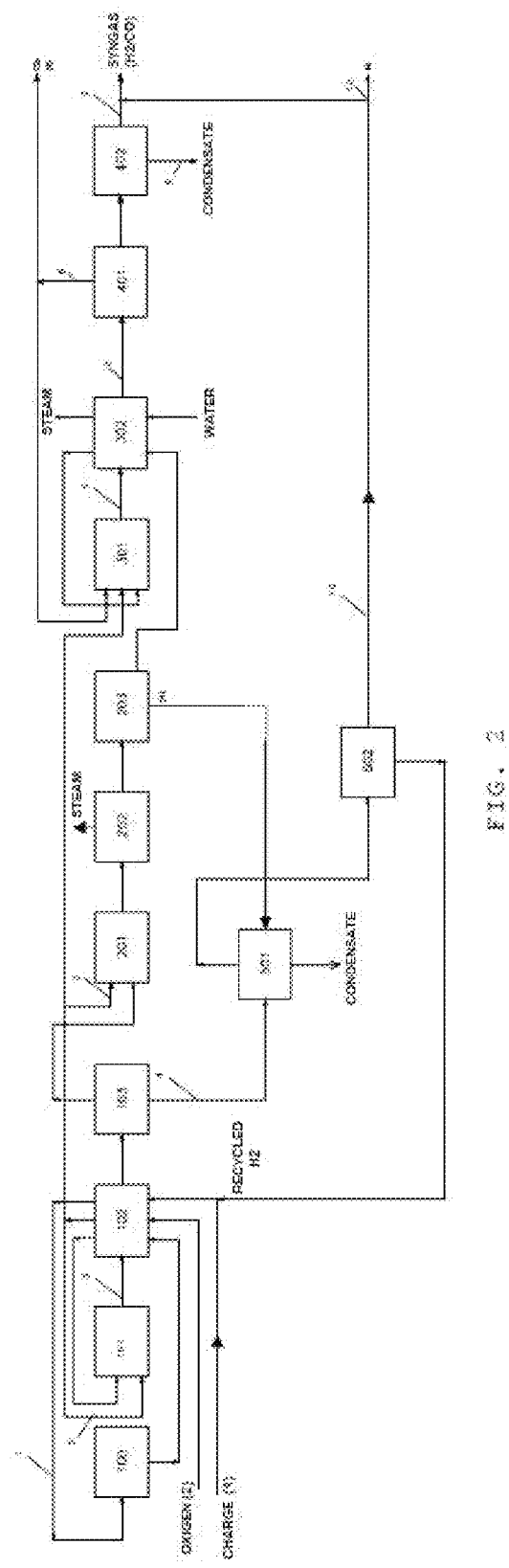

The above and other characteristics and advantages of the invention will emerge clearly from the ensuing detailed description with reference to the attached plates of drawings, wherein:

FIG. 1 is a schematic illustration of the non-integrated membrane reactor according to the invention; and FIG. 2 is the block diagram of the process of production of syngas, hydrogen, and $CO_2$, according to the invention.

With reference to FIG. 1, the first purpose of the present invention is to develop an architecture that will enable the same charge conversion at a temperature lower than the conventional CPO technology through two or more stages, each characterized by a reaction stage followed by a separation stage.

A diagram exemplifying the membrane reactor according to the invention is shown in FIG. 1. In the case illustrated, the reactor is constituted by three CPO sections, each of which is followed by a separator. Between a partial-oxidation section and the corresponding separator heat exchangers are provided for pre-heating the reagents at input and cooling the products of the catalytic reaction.

Forming a further purpose of the present invention is the use of the open architecture of the membrane reactor just described for development of a process for the production of syngas and hydrogen starting from reagents comprising liquid hydrocarbons, gaseous hydrocarbons, and/or oxygenated compounds, also deriving from biomasses, and mixtures thereof, wherein:

the gaseous hydrocarbons are selected in the group comprising natural gas, liquid petroleum gas, gaseous hydrocarbon currents deriving from refinery processes and/or processes of any chemical plant, and mixtures thereof;

the liquid hydrocarbons are selected in the group comprising naphthas, gas-oils, high-boiling gas-oils, light cycle oils, heavy cycle oils, de-asphalted oils, and mixtures thereof; and the oxygenated compounds are selected in the group comprising glycerine, triglycerides, carbohydrates, methanol, ethanol, and mixtures thereof, said process being characterized in that it comprises:

a section for pre-heating the reagents to the temperature comprised between 100° C. and 500° C.;

a first section for short-contact-time catalytic partial oxidation, in which said reagents react with an oxidant including oxygen or air enriched in oxygen to yield syngas;

a first thermal-recovery section comprising two superheaters, one for the charge and the other for the oxygen, cooling the syngas produced;

a first separation section, where hydrogen is separated from the gas at output from the first CPO reactor;

a second CPO section, where added to the gas coming from the first separation module is an oxidant including oxygen or air enriched in oxygen to yield further syngas;

a second separation section, where other hydrogen is separated from the gas leaving the second CPO reactor;

a third CPO section, where added to the gas coming from the second separation module is an oxidant, oxygen, or air enriched in oxygen, to yield further syngas;

a section for removal of the carbon dioxide contained in the current produced by the third CPO section, after a section of thermal recovery in the boiler to generate steam;

a section for recycling $CO_2$ recovered at the third partial-oxidation section for partial conversion of $CO_2$ into syngas, and possibly a section for reaction of said $CO_2$ with $H_2$ through the RWGS reaction;

a section for cooling and removal of the condensate of the syngas current produced prior to delivery thereof at the battery limits.

A further embodiment of the present invention regards a process as described previously, possibly comprising a section for purification of hydrogen produced by means of pressure-swing adsorption (PSA), downstream of the section for cooling and removal of the condensate present in the hydrogen.

The capacity to the PSA for the possible final hydrogen purification, having reduced considerably the impurities present in the hydrogen thanks to the membrane, result more efficient and less costly; moreover, the purge gas produced is used for hydrodesulphuration of the charge by compression and recycling.

A further embodiment of the present invention regards a process that, as described previously, comprises a section for hydrodesulphuration of the reagents.

Finally, the set-up of the process may be such as to necessitate, instead of two stages, reaction plus separation, three or more stages for achieving conversion of the fixed charge. All these aspects together render, in different scenarios, the cost of production of the syngas and/or hydrogen more competitive as compared to what can be obtained using with conventional ATR-SR or STR-CPR technology without membranes (see Attachment 1, where a comparison between the costs is presented).

The block diagram of the process of production of syngas and hydrogen forming the subject of the present invention is illustrated in FIG. 2, where:

100 is the hydrodesulphuration section;
101 is the first SCT-CPO reaction section;
102 is the first heat-recovery section;
103 is the first module for separation of hydrogen from syngas;
201 is the second SCT-CPO reaction section;
202 is the second heat-recovery section;
203 is the second module for separation of hydrogen from syngas;
301 is the third SCT-CPO reaction section;
302 is the third heat-recovery and heat-production section;
401 is the section for removal of carbon-dioxide content from the syngas current, which can be delivered in part or totally at the battery limits or recycled at the third reaction section;
402 is the section for cooling and removal of the condensate from the syngas current;
501 is the section for cooling and removal of the condensate from the hydrogen current;
502 is the section for purification of the hydrogen produced with PSA.

According to what is represented in FIG. 2, the feed 1 is pre-heated in 102 prior to being hydrodesulphurized in 100; it is then mixed with the oxidant 2 and once again pre-heated to a temperature of between 100° C. and 400° C. prior to reaction in the first CPO section 101, where the reagents are converted into syngas 3.

The syngas is cooled by pre-heating the feed 1 and the oxidant 2 in the first heat-recovery section 102.

The syngas cooled to a temperature of 450-500° C. enters the first separation module 103, where a part 4 of hydrogen is separated.

The non-separated fraction is mixed with further oxidant 2 in the second CPO section 201, where the non-converted charge reacts to yield further syngas. The hot syngas at output from 201 is cooled by means, of a recovery boiler 202 to produce steam to be used in the reactor 101 or as sweeping steam in the modules 101 and 202.

The syngas cooled to a temperature of 450-550° C. enters the second separation module 203, where a part of hydrogen is separated.

The non-separated fraction is mixed with further oxidant 2 in the third CPO section 301, where all the charge is converted into syngas 5.

The hot syngas at output from 301 at a temperature of between 600° C. and 950° C., is cooled by means of a recovery boiler 302 for producing steam prior to being fed to the section 401, where the $CO_2$ is removed on the line 6. This recovered $CO_2$ stream may contain at least 98% vol % carbon dioxide. In the section (401), the removing process of $CO_2$ may be carried out with an amine solution as washing solvent. Part of the steam produced by the process may be used for regenerating the amine solution, causing the release of a concentrated current of carbon dioxide. Next, in the cooling section 402, the condensed steam is removed through the line 8.

The syngas without $CO_2$ and water vapour is mixed with a part of the hydrogen coming from the line 10 to keep the $H_2$/CO ratio at the desired value (2:1); the gas thus obtained is delivered on the line 7 at the battery limits. The hydrogen produced in the separation modules 103 and 203 is cooled in 501 for separating the condensate and is compressed prior to being fed to the PSA 502 for final purification of the hydrogen, which exits on the line 10. The purge gas produced in 502 is compressed and recycled at the section 101.

The invention claimed is:

1. A process for the production of syngas and hydrogen starting from reagents comprising liquid hydrocarbons, gaseous hydrocarbons, and/or oxygenated compounds, also deriving from biomasses, and their mixtures, comprising:
   reacting said reagents with an oxidant including oxygen, air, or air enriched in oxygen to yield syngas in three sections for short-contact-time catalytic partial oxidation (SCT-CPO);
   cooling the syngas from outlets of said three sections for SCT-CPO in three thermal-recovery sections comprising a first thermal-recovery section for cooling the syngas in the output from a first SCT-CPO section and preheating the reagents to the temperature between 100° C. and 500° C. and a first boiler and a second boiler that generate steam by cooling the syngas produced respectively by a second SCT-CPO section and a third SCT-CPO section;
   separating the hydrogen using semipermeable membranes that operate at 450-500° C., each of said first thermal-recovery section and said first boiler being followed by a section for separation of the hydrogen using semipermeable membranes, said semipermeable membranes being constituted by metallic or non-metallic inorganic material;
   removing the carbon dioxide contained in the syngas and for recycling for conversion to syngas in the third SCT-CPO section; and
   cooling and removing condensate from the syngas in the third SCT-CPO section.

2. The process for the production of syngas and hydrogen starting from reagents comprising liquid hydrocarbons, gaseous hydrocarbons, and/or oxygenated compounds according to claim 1, wherein:
   the gaseous hydrocarbons are selected in the group comprising natural gas, liquid petroleum gas, gaseous hydrocarbon currents deriving from refinery processes and/or processes of any chemical plant, and their mixtures;
   the liquid hydrocarbons are selected in the group comprising naphthas, gas-oils, high-boiling gas-oils, light cycle oils, heavy cycle oils, de-asphalted oils, and their mixtures; and
   the oxygenated compounds are selected in the group comprising glycerine, triglycerides, carbohydrates, methanol, ethanol, and their mixtures.

3. The process according to claim 1, wherein the first thermal-recovery section for preheating the reagents is an oven.

4. The process according to claim 3, further comprising purifying the hydrogen in a section for purification of the hydrogen, wherein a part of purge gas resulting from the purification of the hydrogen produced is used as fuel for said oven.

5. The process according to claim 1, wherein the operating conditions in each of the SCT-CPO section, are:
   input temperature comprised between 100° C. and 400° C., in the first SCT-CPO section, and between 100° C. and 600° C., in the second and third SCT-CPO sections;
   steam/carbon ratio in feed comprised between 0 v/v and 2 v/v;
   $O_2$/carbon ratio in feed comprised between 0.40 v/v and 0.70 v/v;
   gas hourly space velocity (GHSV) comprised between 1000 $h^{-1}$ and 500.000 $h^{-1}$; and
   output temperature from the reactor comprised between 600° C. and 950° C.

6. The process according to claim 1 further comprising purifying the hydrogen in a section for purification of the hydrogen produced by means of pressure-swing adsorption and generation of purge gas with medium calorific value.

7. The process according to claim 1, further comprising a section for hydrodesulphuration of the reagents.

8. The process according to claim 1, wherein in the section for removal of the carbon dioxide contained in the syngas and for recycling for conversion to syngas, the removing process of carbon dioxide is carried out with an amine solution as washing solvent.

9. The process according to claim 8, wherein a part of the steam produced by the process is used for regenerating said amine solution, causing the release of carbon dioxide.

10. The process according to claim 1, wherein a part of the steam produced by the process is used for pre-heating the reagent mixture prior to the section for production of the syngas.

11. The process according to claim 1, wherein the semipermeable membranes are constituted by non-metallic, inorganic membranes capable of working in the range of 600-700° C.

12. The process according to claim 1, wherein the $CO_2$ associated to the production of hydrogen is reconverted into syngas through the dry-reforming reaction $$CH_4 + CO_2 \rightarrow 2CO + 2H_2 \tag{1}$$

minimizing the $CO_2$ emissions into the atmosphere.

13. The process according to claim 1, wherein the carbon dioxide removed from the syngas is at least 98 vol %.

14. The process according to claim 1, wherein, after removal of $CO_2$, a part thereof is made to react with $H_2$ in accordance with the reaction:

$$CO_2 + H_2 \rightarrow CO + H_2O$$

minimizing the emissions of $CO_2$ and minimizing the consumption of charge and oxygen.

15. The process according to claim 1, wherein the syngas has a $H_2$:CO ratio of 2 to 1.

* * * * *